(12) United States Patent
Johnson et al.

(10) Patent No.: US 7,520,113 B2
(45) Date of Patent: Apr. 21, 2009

(54) REVERSE DRIVE ENGAGING MECHANISM FOR A FEEDER OF AN AGRICULTURAL COMBINE

(75) Inventors: Orlin W. Johnson, Geneseo, IL (US); Guy N. Thedford, Naperville, IL (US); George R. Vater, Clarendon Hills, IL (US)

(73) Assignee: CNH America LLC, New Holland, PA (US)

( * ) Notice: Subject to any disclaimer, the term of this patent is extended or adjusted under 35 U.S.C. 154(b) by 239 days.

(21) Appl. No.: 11/433,729

(22) Filed: May 12, 2006

(65) Prior Publication Data

US 2007/0261379 A1   Nov. 15, 2007

(51) Int. Cl.
*A01D 69/06* (2006.01)
(52) U.S. Cl. .......................................... 56/11.2; 460/20
(58) Field of Classification Search .............. 56/10.2 R, 56/10.3, 10.2 J, 10.5, 10.8, 11.2, 11.9; 460/20
See application file for complete search history.

(56) References Cited

U.S. PATENT DOCUMENTS

| 4,138,837 | A |   | 2/1979  | Love ............................ 56/112 |
| 4,160,456 | A | * | 7/1979  | Hawkins et al. ............. 460/116 |
| 4,218,864 | A | * | 8/1980  | Allemeersch et al. ........ 56/11.2 |
| 4,430,847 | A |   | 2/1984  | Tourdot et al. ............... 56/10.7 |
| 4,467,590 | A | * | 8/1984  | Musser et al. ................ 56/11.2 |
| 4,663,919 | A |   | 5/1987  | Stroh et al. .................. 56/11.2 |
| 4,879,868 | A | * | 11/1989 | Love ............................ 56/11.2 |
| 5,419,086 | A |   | 5/1995  | Duckinghaus .............. 56/14.5 |
| 5,462,486 | A |   | 10/1995 | Norton ........................ 460/20 |
| 5,791,128 | A |   | 8/1998  | Rogalsky ..................... 56/14.5 |
| 5,996,324 | A |   | 12/1999 | Oligmueller ................. 56/11.2 |
| 6,396,173 | B1 | * | 5/2002 | Prampolini ................... 310/12 |
| 6,644,006 | B1 | * | 11/2003 | Merritt et al. ................. 56/341 |
| 6,651,412 | B1 |   | 11/2003 | Sierk et al. .................... 56/10.3 |
| 6,681,552 | B2 |   | 1/2004  | Nelson et al. ................ 56/11.2 |
| 6,722,112 | B2 |   | 4/2004  | Pierce et al. ................. 56/11.2 |
| 6,925,788 | B2 | * | 8/2005  | Nelson et al. ................ 56/11.2 |

* cited by examiner

*Primary Examiner*—Thomas B Will
*Assistant Examiner*—Mai T Nguyen
(74) *Attorney, Agent, or Firm*—Michael G. Harms; John William Stader; Patrick M. Sheldrake

(57) ABSTRACT

A reverse drive engaging mechanism for a feeder of an agricultural combine, including a power unit including a drive motor having an output gear drivingly rotatable by the motor about an output axis therethrough, and support structure supporting the power unit and configured to be fixedly mounted proximate to a drive gear of a mechanism to be reversed. The support structure supports the power unit such that when the support structure is mounted the output axis will be substantially parallel to a drive axis about which the drive gear is rotatable, and the support structure allows the power unit to be moved substantially linearly in a transverse direction relative to the axes between a disengaged position wherein the output gear is disengaged from the drive gear, and an engaged position wherein the output gear is engaged with the drive gear. The mechanism includes an actuator controllably operable for linearly moving the power unit at least from the disengaged position to the engaged position, the actuator being operable for initially causing initial rotation of the output gear during the engagement with the drive gear, and a mechanism for withdrawing or disengaging the output from the drive gear after use.

18 Claims, 7 Drawing Sheets

REVERSE DRIVE ENGAGING MECHANISM FOR A FEEDER OF AN AGRICULTURAL COMBINE

TECHNICAL FIELD

This invention relates generally to an engaging mechanism for a reverse drive for a feeder of an agricultural combine, and more particularly, wherein the engaging mechanism includes a power unit including an output gear, supported on structure at least generally linearly movable by an actuator between a non-driving or disengaged position wherein the output gear is disengaged from a drive gear in connection with a conveyor mechanism of the feeder and/or driven components of a header mounted to the feeder, and a driving position wherein the gears are engaged, the structure fixedly holding the power unit in the driving position to substantially limit lateral and other undesirable movements thereof in relation to the drive gear, and supporting the power unit when in the non-driving position.

BACKGROUND OF THE INVENTION

It is well known that from time to time during the operation of an agricultural combine, blockages will occur in the feeder operable for conveying harvested crop material from a header to a threshing or separating system of the combine, and/or within the header, and/or at the interface between the header and the feeder where crop material enters the feeder. Typically, the feeder includes an upwardly and rearwardly inclined feeder housing containing a feeder conveyor mechanism which will typically include a forwardly located rotatable drum and rearwardly located drive sprockets encircled by at least two spaced apart, endless feeder chains connected together by slats. The drive sprockets are rotated to drive the feeder chains and slats in an upward and rearward direction along a floor of the feeder housing, such that the slats will engage and drag crop material conveyed by the header to an inlet opening of the feeder housing, through the inlet opening and onto the floor, so as to be thereafter conveyed upwardly and rearwardly along the floor by the slats, for induction into the inlet of the threshing or separating system. Also typically, the feeder conveyor mechanism and the powered mechanism or mechanisms of the header, i.e., harvesting mechanisms and conveyors thereof, are commonly driven by a belt or other drive system of the combine. Blockages of the flow of the crop material in the header, and/or jamming of operating mechanisms of the header, blockages in the vicinity of the inlet opening of the feeder, and along the floor of the feeder housing, can occur for a variety of reasons, such as a result of induction of a hard object, such as a downed fence post, a log; an animal carcass; a particularly large volume of crop material; a large wad of viny plants; and/or tall weeds. Such blockages can simply block induction of crop material into the header and/or the feeder, and/or result in stalling of the operation of the conveyor mechanism of the feeder and/or one or more operating mechanisms of the header, and therefore must be removed or dislodged.

A well known manner of removal or dislodgement of a blockage is to operate the feeder conveyor mechanism, and the jointly driven header mechanisms, in a reverse direction, that is, with regard to the feeder, wherein the feeder chains and slats are moved downwardly and forwardly along the feeder housing floor, such that the wad or other blockage is broken up and/or expelled from the feeder housing inlet back into the header. This reversal process is also often successful in unjamming mechanisms of the header and dislodging blockages thereof. After breakup or expulsion of the blockage, the feeder conveyor mechanism and header can typically then be operated in the normal direction.

Typically, a separate reversing drive is provided for the reverse operation of the feeder conveyor mechanism and the header. Reasons for this include that significantly increased drive force is often required for the dislodgment of a blockage, and that it is desirable to perform the reversing operation at a much slower speed than the normal feeder and header operation. Prior known reversing drive apparatus are disclosed in Duckinhaus U.S. Pat. No. 5,419,086, issued May. 30, 1995 to Claas Ohg, and Norton U.S. Pat. No. 5,462,486, issued Oct. 31, 1995. However, observed shortcomings of the apparatus disclosed in U.S. Pat. No. 5,419,086 include that it utilizes a pivoting support structure supporting the power unit which is pivotally supported at a location spaced a substantial distance from the power unit itself, so as possibly be less rigid than may be desirable, and that, when not in use, is suspended by a spring above a drive gear with which it is drivingly engaged during operation. A concern with this arrangement is that in the event of breakage and/or relaxation of the spring, or sudden downward jarring movements, violent contact between the gear of the power unit and the drive gear may occur, resulting in damage to one or both. Observed shortcomings of the apparatus disclosed in U.S. Pat. No. 5,462,486 include that it is relatively complex, for instance, as it requires an angular drive and a large number of components, that it relies on engagement between a drive sprocket thereof and a relatively short extent of drive chain for the forces necessary to be transmitted thereby for dislodgment of a blockage, which forces are often large in magnitude, and the feeder drive mechanism is depicted as comprising a long chain, which has been found to be an inefficient means of power transmission for feeder applications, compared to many alternative belt and/or shaft drives.

Thus, what is sought is a reverse drive engaging mechanism for a feeder and a header of a combine, which overcomes one or more of the shortcomings set forth above, is reliable, robust, and relatively inexpensive.

SUMMARY OF THE DISCLOSURE

What is disclosed is a reverse drive engaging mechanism for a feeder and a header, which overcomes one or more of the shortcomings set forth above, is reliable, robust, and relatively inexpensive.

According to a preferred aspect of the invention, a reverse drive engaging mechanism for a feeder of an agricultural combine, includes a power unit including a drive motor having an output gear drivingly rotatable by the motor about an output axis therethrough. The mechanism includes support structure supporting the power unit and configured to be fixedly mounted proximate to a drive gear thereof rotatable about a drive axis, the support structure supporting the power unit such that when the support structure is mounted the output axis will be substantially parallel to the drive axis, and the support structure will allow the power unit to be moved substantially linearly in a transverse direction relative to the axes between a disengaged position wherein the output gear is disengaged from the drive gear, and an engaged position wherein the output gear is engaged with the drive gear. The mechanism also includes an actuator controllably operable for linearly moving the power unit at least from the disengaged position to the engaged position.

According to another preferred aspect of the invention, the reverse drive engaging mechanism further includes a biasing element operable for moving the power unit from the engaged position to the disengaged position. As a preferred embodiment, the biasing element can comprise a spring.

According to another preferred aspect of the invention, the actuator is a fluid actuator, such as, but not limited to, a fluid cylinder or piston assembly, and the drive motor is a fluid driven motor connected in fluid communication with a source of pressurized fluid through the fluid actuator, such that when pressurized fluid is directed to the fluid actuator, some of the pressurized fluid will pass through the actuator so as to slowly initially rotate the fluid driven motor for engaging or enmeshing the output gear with the drive gear. As a result, full engagement of the output gear and the drive gear will not be prevented by tooth to tooth alignment thereof.

According to still another preferred aspect of the invention, the support structure includes a first structural member configured to be fixedly mounted on a feeder, and a second structural member on which the power unit is fixedly mounted, the second structural member being supported by the first structural member for sliding movement relative thereto in the transverse direction, for moving the power unit between the engaged and disengaged positions. The support structure should be sufficiently rigid to prevent any significant rotation or lateral movement between the first and second structural members, and the first structural member is preferably configured for supporting the second structural member in the disengaged position, such that the biasing element (i.e. a spring) or the actuator is not required to support the weight of the second structural member, the power unit, and any hoses or wires connected thereto.

As a result, the reverse drive engaging mechanism of the invention is simple in construction, sturdy, and reliable.

DETAILED DESCRIPTION OF THE PREFERRED EMBODIMENTS

Figure 1:
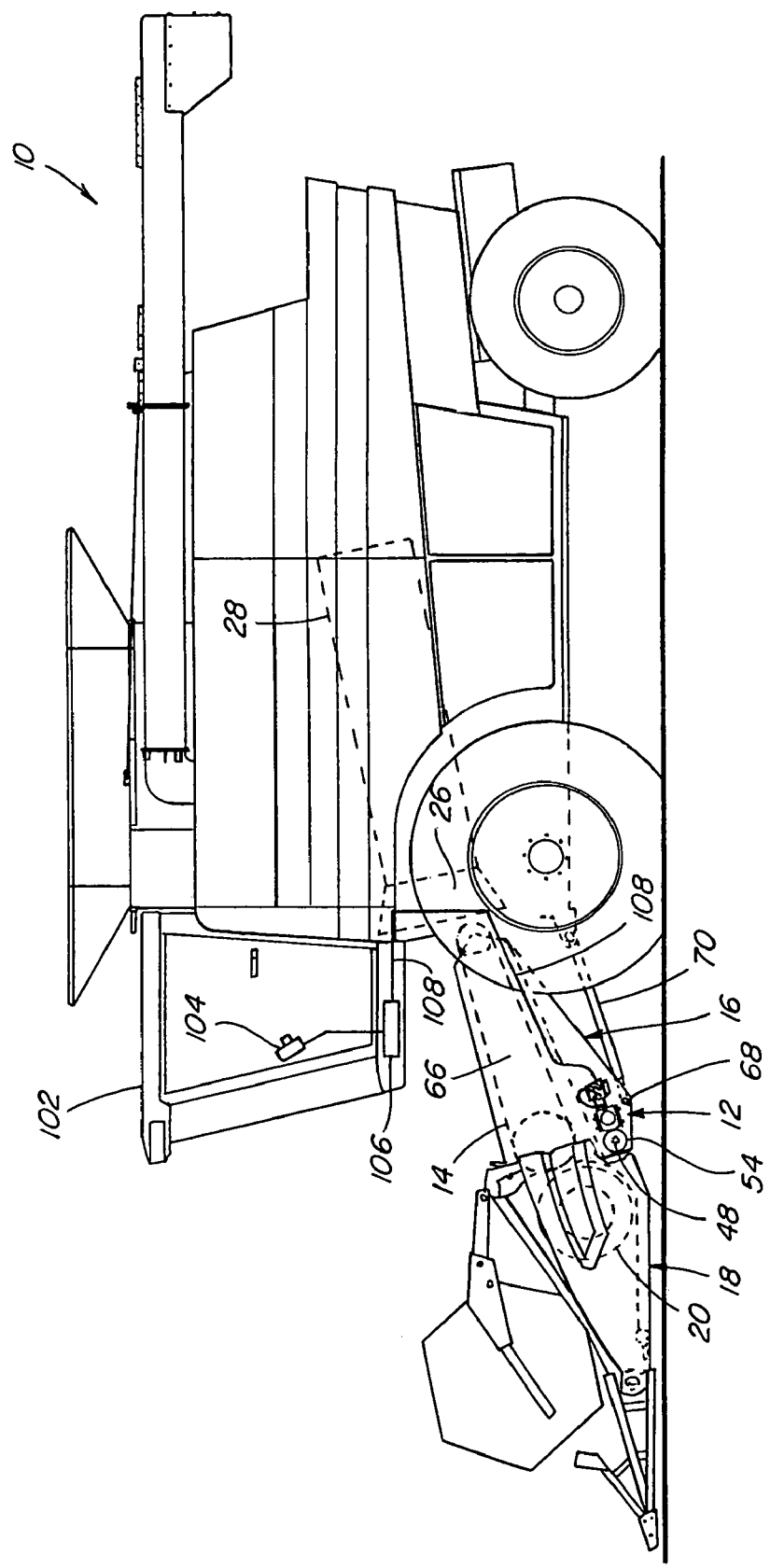
FIG. 1 is a simplified side view of an agricultural combine including a reverse drive engaging mechanism of the invention in connection with a feeder of the combine.
Figure 4:
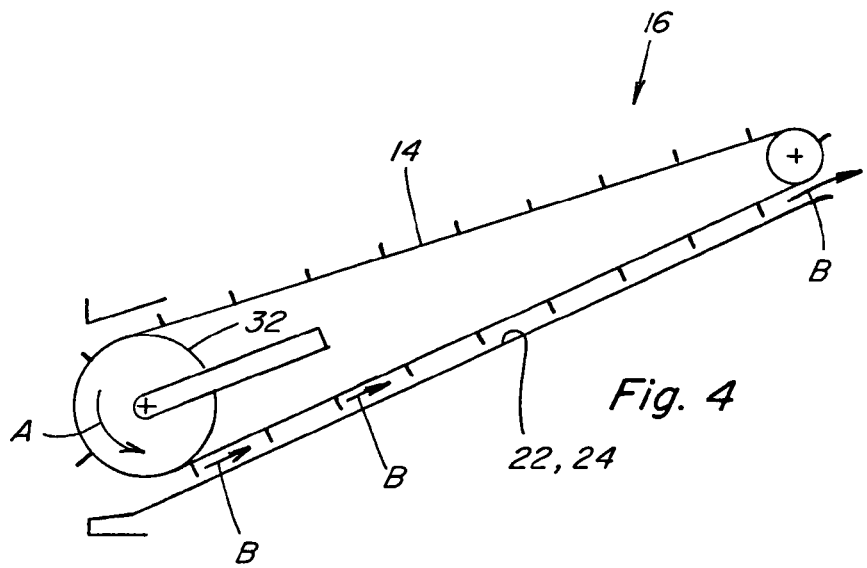
FIG. 4 is a simplified side view of the feeder conveyor mechanism, illustrating operation thereof for conveying crop material along a floor of the feeder.
Figure 5:
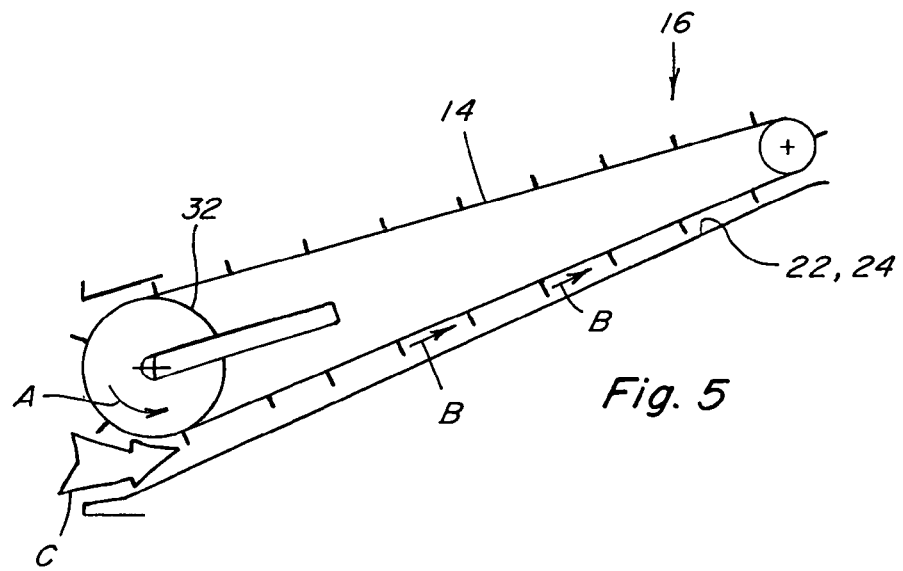
FIG. 5 is another simple side view of the feeder conveyor mechanism, illustrating a crop material blockage condition at an inlet end thereof.

Referring now to the drawings, wherein like numerals refer to like parts, in FIG. 1 an agricultural combine 10 is shown, including a reverse drive engaging mechanism 12 constructed and operable according to the teachings of the present invention for reversing operation of a feeder conveyor mechanism 14 of a feeder 16 of combine 10, and also powered elements and mechanisms of a header of the combine. Generally, combine 10 includes a header 18 mounted on a front end of feeder 16 and operable in the well-known, conventional manner, for severing or otherwise harvesting crops (not shown) from a field and conveying the cut crops to an inlet opening of feeder 16. Header 18 illustrated is representative of a variety of small grain headers and includes powered mechanisms, including, but not limited to, a sidewardly extending, elongate auger 20 rotatable for conveying severed crops to feeder 16. Referring briefly also to FIGS. 4 and 5, the cut crops are then conveyed upwardly and rearwardly within feeder 16 by feeder conveyor mechanism 14 along a floor 22 of a feeder housing 24, as denoted by arrows B, to an inlet region 26 of a threshing system 28 within combine 10 (FIG. 1). Threshing system 28 is operable for separating grain from straw, stalks, pods, cobs, and the like, in the well-known manner.

Figure 2:
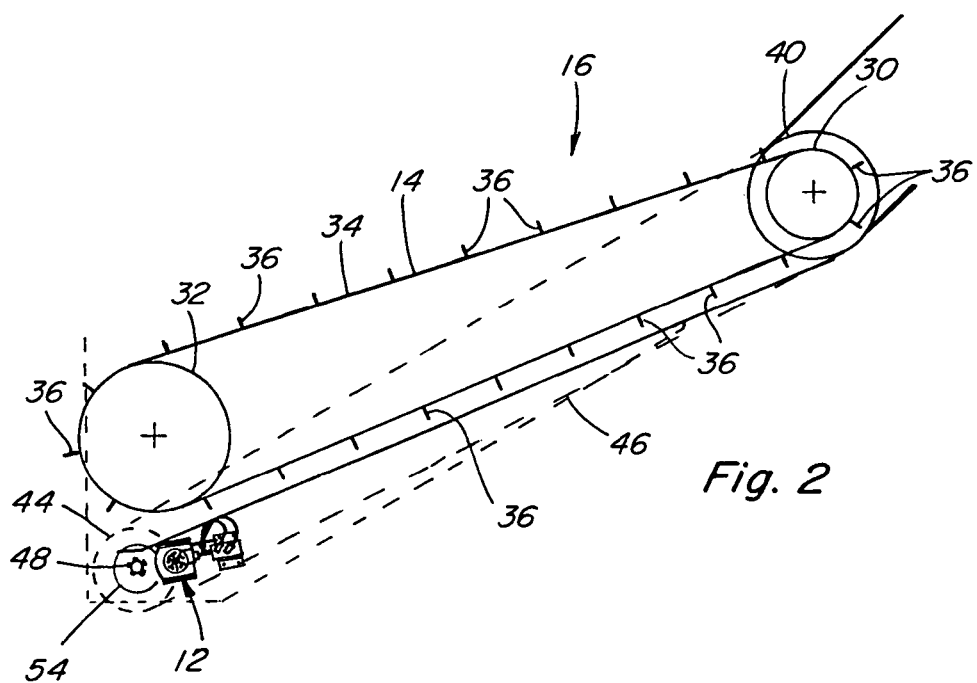
FIG. 2 is a simplified side view of the feeder, illustrating the reverse drive engaging mechanism of the invention in association with a feeder conveyor mechanism of the feeder.
Figure 3:
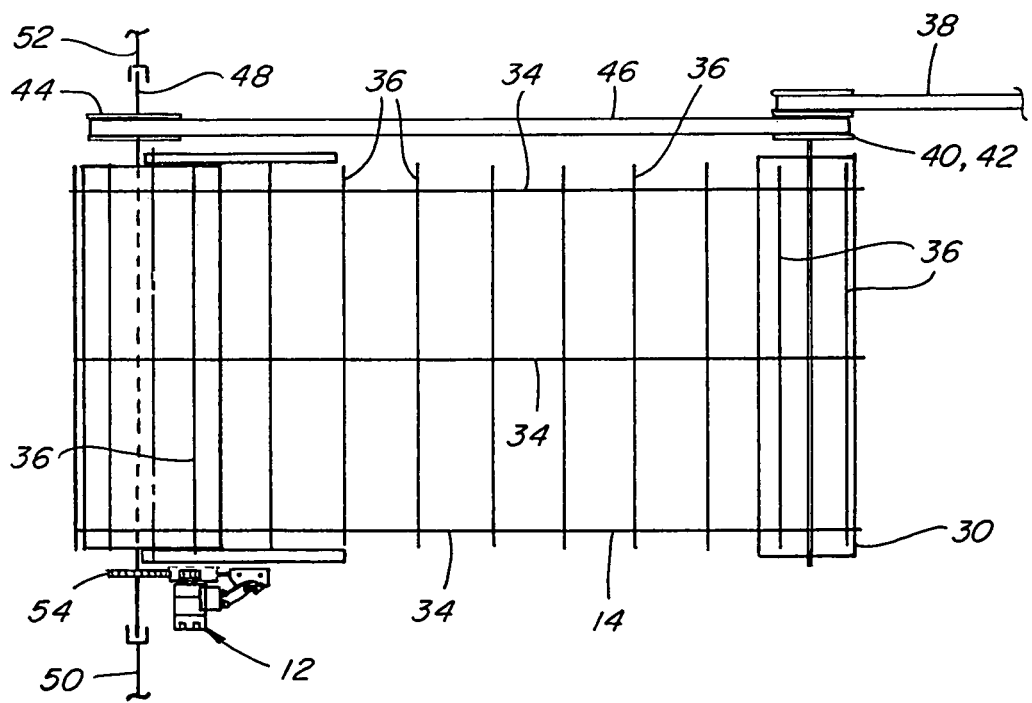
FIG. 3 is a simplified top view of the feeder, further illustrating the reverse drive engaging mechanism of the invention and connection thereof to the feeder conveyor mechanism.

Referring also to FIGS. 2 and 3, feeder conveyor mechanism 14 of feeder 16 includes a drive sprocket assembly 30 extending across the upper rear region thereof, and a driven drum 32 extending across the lower forward region thereof, encircled by a plurality of feeder chains 34. A plurality of slats 36 extend between chains 34 at spaced intervals therealong. Drive sprocket assembly 30 is driven by a belt drive 38 in connection with a powerplant (not shown) of combine 10, for moving chains 34 and slats 36 in the upward and rearward direction along the floor 22 for conveying the crop material in the above described manner (FIGS. 4 and 5). A header drive 40 includes a sheave 42 which is rotated by belt drive 38, a sheave 44 adjacent to the front lower end of feeder 16, and a belt 46 encircling sheaves 42 and 44 for effecting joint rotation thereof. Sheave 44 is mounted on a jackshaft 48 of drive 40 for rotation therewith, jackshaft 48 extending sidewardly beneath drum 32, and connecting with drive shafts 50 and 52 (FIG. 3) for powering apparatus of header 18, including auger 20 (FIG. 1). For the purposes of the present invention, jackshaft 48 additionally includes a reverse drive gear 54 mounted thereon for rotation therewith, and engageable by reverse drive engaging mechanism 12 of the invention, for reversing the direction of rotation of both header drive 40 and feeder conveyor mechanism 14, as explained hereinbelow.

Essentially, referring to FIGS. 4 and 5, under normal operating conditions, crop material conveyed by feeder conveyor mechanism 14 when rotated in the direction denoted by arrow A, will flow along floor 22 of feeder housing 24, as denoted by arrows B. Occasionally, an exceptionally large mass or wad of crop material, and/or other material, particularly viny plants, and/or tall weeds, denoted by large arrow C in FIG. 5, will not feed into the space between drum 32 and floor 22, or otherwise will be incapable of induction into feeder 16, or will become pinched between drum 32 and floor 22, so as to create a blockage. As noted above, blockages (not shown) can occur at other locations, such as in a header such as header 18 (FIG.

1) connected to feeder 16, and mechanisms and apparatus of a header such as header 18 can become jammed, for a variety of reasons, for instance, as a result of induction of a hard object. Such blockages and jamming can result in stalling of the operation of conveyor mechanism 14 and header drive 40, and thus the cessation of infeeding of crop material to feeder 16, and therefore must be removed or dislodged, before normal operation of combine 10 can be resumed.

Figure 6:
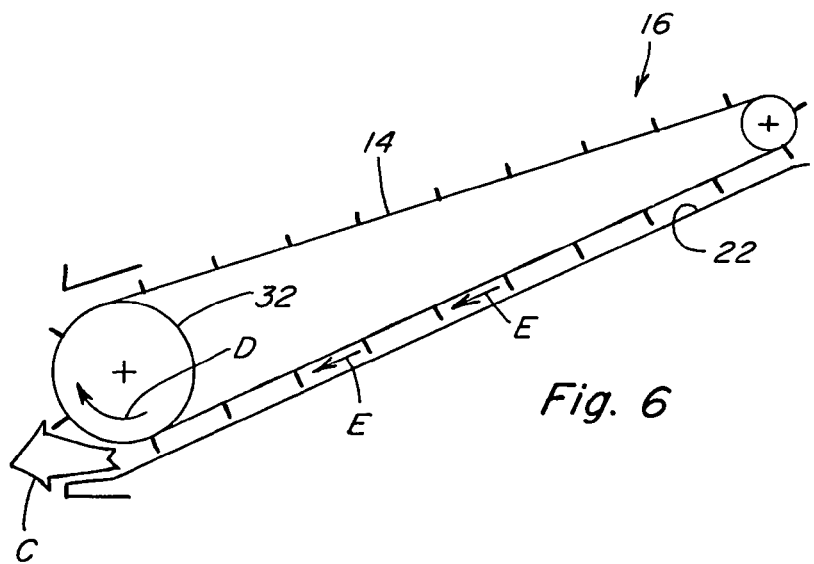
FIG. 6 is a simplified side view of the feeder conveyor mechanism, illustrating reversing operation thereof for removing the crop material blockage condition as effected by the reverse drive engaging mechanism of the invention.

Removal of a blockage or jam, such as that denoted by arrow C, can be done manually, but it is preferred, if possible, to do so by operation of feeder conveyor mechanism 14 and header drive 40 in a reverse direction, as denoted by arrow D in FIG. 6. During such reverse operation of mechanism 14 and drive 40, the crop material on floor 22 will be conveyed in the reverse to the normal direction, as denoted by arrows E. Also, because the rotating apparatus of header 18 is driven by jackshaft 48 of drive 40, the rotating apparatus of header 18 will simultaneously be operated in a reverse direction, to thereby hopefully dislodge any blockage and/or eject any object or objects jamming the apparatus. Typically, when removing a blockage, it is desirable to operate feeder conveyor mechanism 14 and header drive 40 more slowly, and with high torque, as it may require substantial force to dislodge the blockage or jam. After dislodgment, the crop material comprising the blockage or items which caused the jamming will hopefully be at least somewhat broken up, untangled or loosened by the reversing operation. As a result, when normal operation of mechanism 14 and header drive 40 is resumed, the crop material may feed without problem into and through feeder 16. If not, the reverse operation can be repeated as required, or the problem crop or other material or item can be manually redistributed and/or removed.

Referring also to FIGS. 7, 8, 9 and 10, reverse drive engaging mechanism 12 is drivingly engageable with reverse drive gear 54, for effecting reverse operation of feeder conveyor mechanism 14 and header drive 40. Mechanism 12 will have a normal or disengaged mode wherein it is disengaged from reverse drive gear 54, to allow free rotation thereof, as denoted by arrow F in FIG. 9, for normal operation of header 18 and feeding of crop material through the feeder as just explained. Reverse drive engaging mechanism 12 will also have an operating or engaged mode wherein it is drivingly engaged with gear 54, for rotating gear 54 in the reverse direction, as denoted by arrow G in FIG. 10, and thereby rotating feeder conveyor mechanism 14 in the reverse direction, as illustrated in FIG. 6, and also header drive 40. Reverse drive engaging mechanism 12 generally includes a power unit 56, which preferably includes a conventionally constructed and operable low speed, high torque capability fluid motor including a rotatable output 58 having an output gear 60 mounted thereon for rotation therewith about an output axis 62 extending therethrough. Power unit 56 is supported such that output axis 62 is maintained in substantially parallel relation to a drive axis 64 extending through jackshaft 48 and gear 54, adjacent to a side 66 of feeder housing 24 of feeder 16. For this purpose, mechanism 12 is preferably supported on a side sheet 68 comprising side 66, as best shown in FIG. 1. A lift cylinder 70 is connected between side sheet 68 and the chassis of combine 10, and is extendable for lifting feeder 16 and header 18, and retractable for lowering them. Side sheet 68 is therefore a relatively strong structure suitable for lifting and supporting a substantial portion of the weight of both feeder 16 and header 18, and thus is also suitable for the present purposes, namely, supporting and maintaining mechanism 12 in driving relation and alignment with gear 54, under high torque conditions, for operating feeder conveyor mechanism 14 in the reverse direction to dislodge a wad or plug of crop material from feeder 16, and the header drive for dislodging blockage of the header or jamming thereof.

Figure 10:
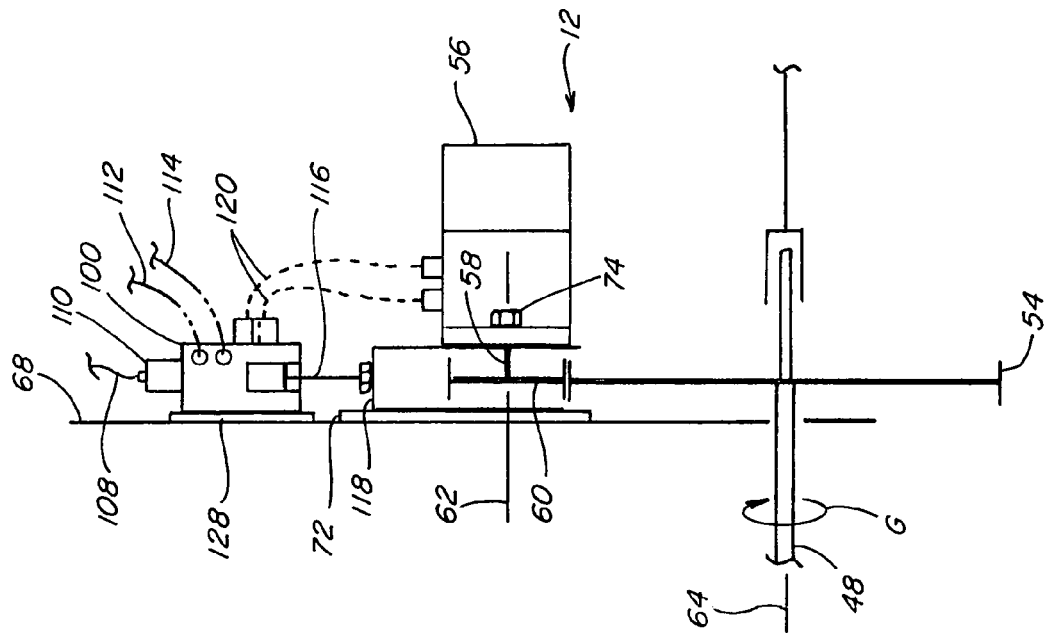
FIG. 10 is another simplified top view of the aspects of the reverse drive engaging mechanism of the invention illustrated in an engaged position in relation to the reverse drive gear.
Figure 9:
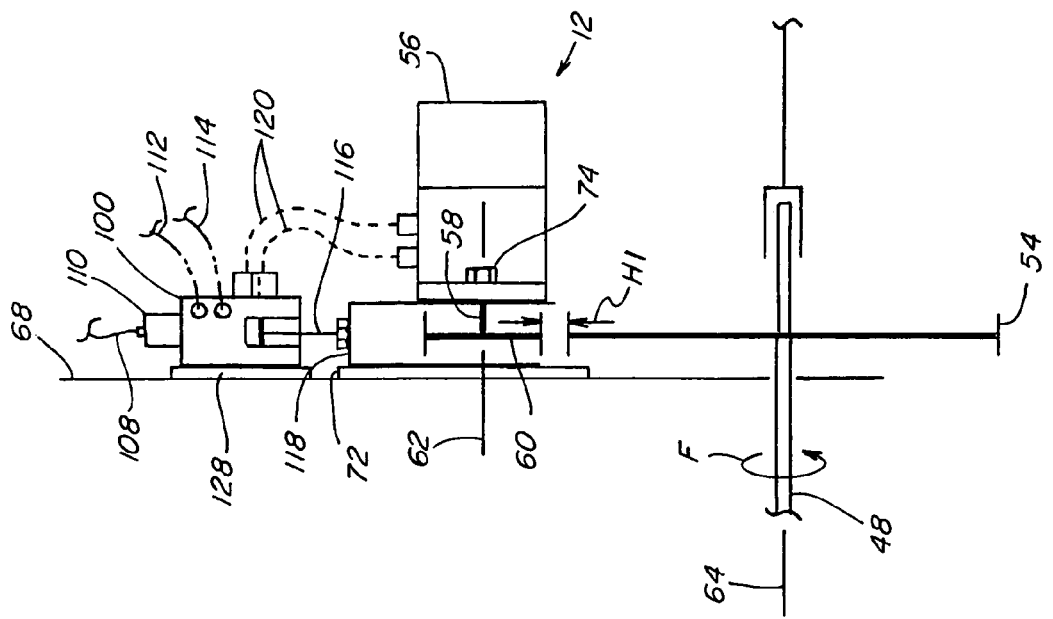
FIG. 9 is a simplified top view of aspects of the reverse drive engaging mechanism of the invention illustrated in a disengaged position in relation to the reverse drive gear.

Mechanism 12 includes support structure 72 configured to be fixedly mounted on side sheet 68, such as by using common fasteners such as bolts 74 and nuts 76, or by welding. Support structure 72 includes a U-shaped bracket 78 which is fixedly attached to side sheet 68 using bolts 74 and nuts 76, and a slide member 80 which is marginally smaller in vertical extent compared to bracket 78, so as to be cooperatively receivable between upper and lower legs 82 and 84 thereof for limited slidable movement in relation thereto in a generally fore and aft direction, transversely to axes 62 and 64, as denoted by arrows H. Slide member 80 is a generally box shape member having an open forward end in connection with an internal cavity (not shown). Power unit 56 is fixedly mounted on slide member 80 adjacent to the forward end thereof using suitable elements, such as bolts 74, such that output gear 60 is disposed in the internal cavity and exposed through the open forward end, in transverse alignment with reverse drive gear 54 through the open forward end, so as to be slidable with slide member 80 by a distance H1 (FIG. 9) between a more rearward non-driving or disengaged position wherein output gear 60 is disengaged from drive gear 54, and a more forward driving or engaged position wherein output gear 60 is engaged with drive gear 54 (FIG. 10).

Figure 11:
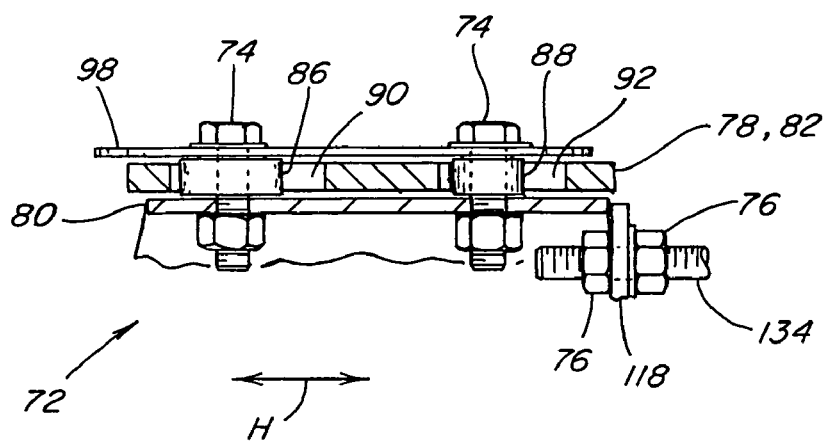
FIG. 11 is a partial sectional view taken generally along the line 11-11 of FIG. 7.

Referring also to FIG. 11, slide member 80 is supported and retained in connection with bracket 78 for slidable movement in relation thereto in direction H, by a plurality of guide members 86 and 88 retained in fore and aft extending slots 90 and 92, respectively, in legs 82 and 84, by bolts 74. Bushings 96 are disposed between each of guide members 86 and 88 and bolts 74 therethrough, and guide members 86 and 88 are vertically retained in slots 90 and 92 by retainer plates 98 disposed, respectively, above upper leg 82 and below lower leg 84. Additional guide members 86A and 88A are mounted to connecting portion 94 by bolts 74 at positions so as to be received in slots 90A (FIGS. 8 and 12) and 92A (FIG. 12) in slide member 80, for bearing much or a substantial portion of the torque loads exerted by operation of power unit 56, as best illustrated in FIG. 12.

Figure 7:
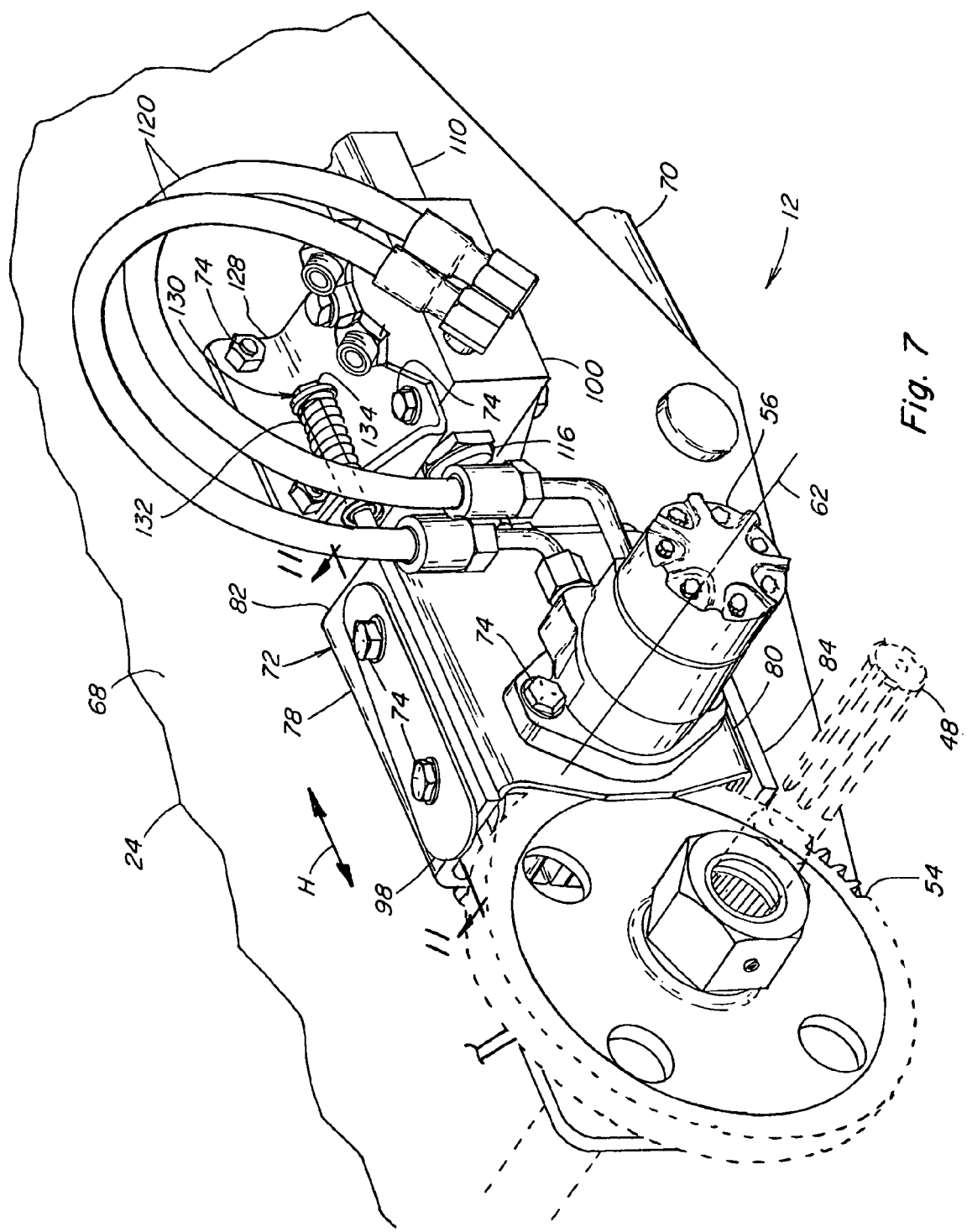
FIG. 7 is an enlarged perspective view of the reverse drive engaging mechanism of the invention illustrated in connection with a reverse drive gear of the feeder conveyor mechanism of the feeder.
Figure 8:
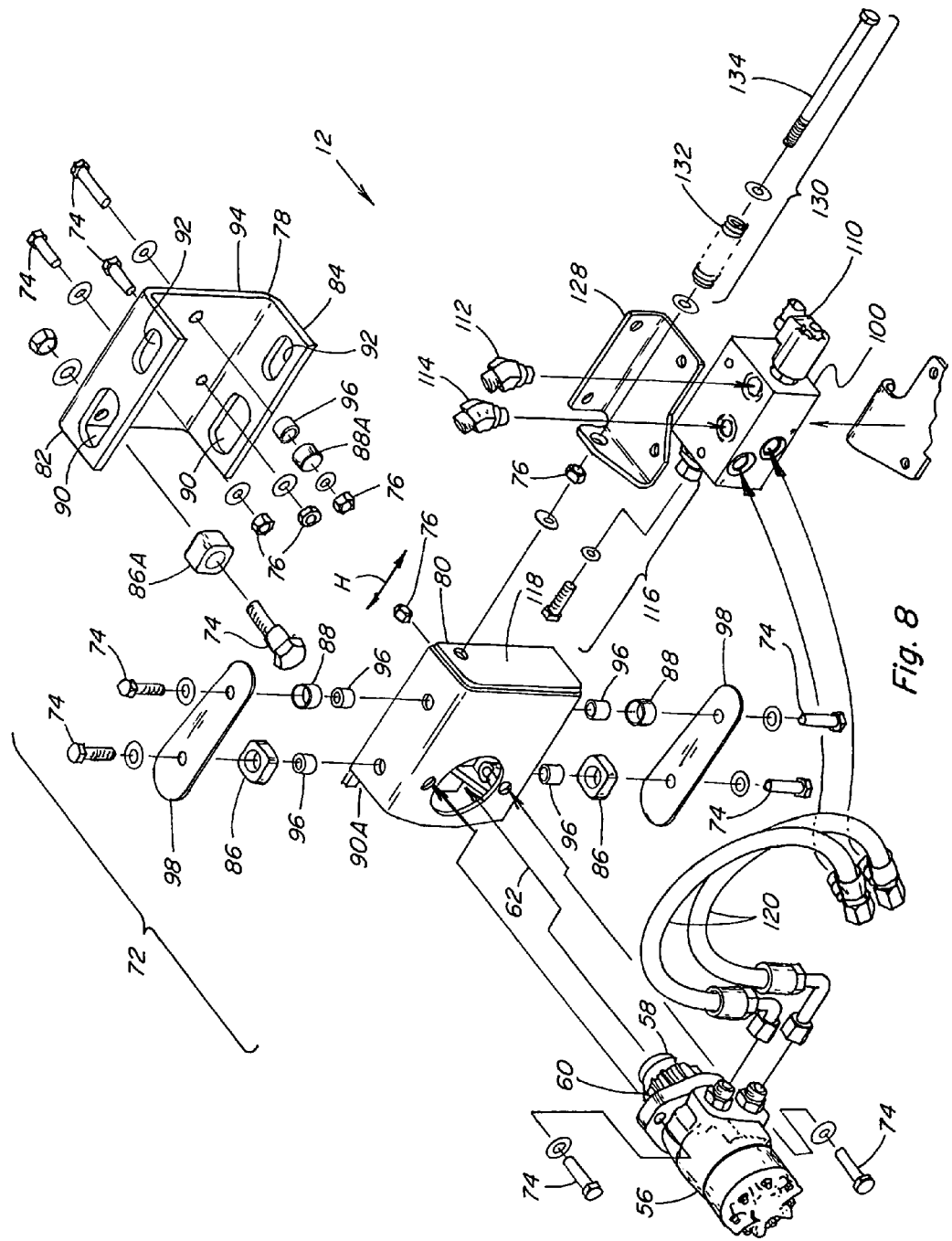
FIG. 8 is an exploded view of the reverse drive engaging mechanism of the invention.

Mechanism 12 (FIGS. 7, 9 and 10) includes an actuator 100 controllably operable for moving slide member 80 and power unit 56 from the disengaged position (FIG. 9) to the engaged position (FIG. 10), responsive to an appropriate input, such as an input initiated by an operator (not shown) in an operator cab 102 (FIG. 1), using an input device 104, such as switch or the like. Input device 104 can be suitably connected with actuator 100, such as via an onboard controller 106 and a controller area network (CAN) 108. Actuator 100 shown is an electrically controlled fluid device, including an actuating solenoid 110 in connection with CAN 108, and a high-pressure fluid line 112 and a return line 114 in connection with a hydraulic system (not shown) of combine 10. Actuator 100 includes a piston assembly 116 which is driven outwardly, which corresponds to the forward direction H, by introduction of pressurized fluid into actuator 100, as controlled by solenoid 110 being energized. This forward movement of piston assembly 116 drives it against a rear plate 118 of slide member 80, to drive slide member 80 and power unit 56 in forward direction H to engage or enmesh output gear 60 with drive gear 54. The extent of the forward movement in direction H is predetermined and controlled by the stroke length of piston assembly 116. During the forward movement of piston assembly 116, actuator 100 will direct the pressurized fluid to flow through fluid lines 120 in connection with power unit 56, to begin turning output 58 and gear 60 very slowly, to facilitate meshing of the teeth of gears 60 and 54, to ensure that the teeth are not forcibly brought together in tooth to tooth contact. Then, with piston assembly 116 fully extended, actuator 100 will allow sufficient fluid flow through power unit 56 for gear 60 to rotate gear 54 with sufficient power for rotating feeder conveyor mechanism 14 and header drive 40 for operating powered elements of header 18, in the reverse direction, for dislodging or releasing any blockage or jamming material. One of fluid lines 120 is a pressurized supply line, and one is a return line, such that a fluid loop is formed through actuator 100 and power unit 56. Actuator 100 is supported on the lower region of feeder housing side sheet 68 by a mounting bracket 128 using suitable fasteners, such as bolts 74 (FIG. 7). A return spring assembly 130 including a spring 132 carried on a threaded rod 134, is connected between bracket 128 and rear plate 118 of slide member 80 with nuts 76. Spring 132 is compressed or biased by forward movement of slide member 80 to store energy, and is operable to release the energy for exerting a return force against slide member 80 for urging it in the rearward direction to disengage gear 60 from gear 54 and retract piston assembly 116, when delivery of pressurized fluid into actuator 100 is ceased by de-energizing of solenoid 110, as controlled by operator input 104. Alternatively, it is contemplated that actuator 100 could be double acting, that is, could be configured so as to withdraw slide member 80 upon receipt of a predetermined input command.

Figure 12:
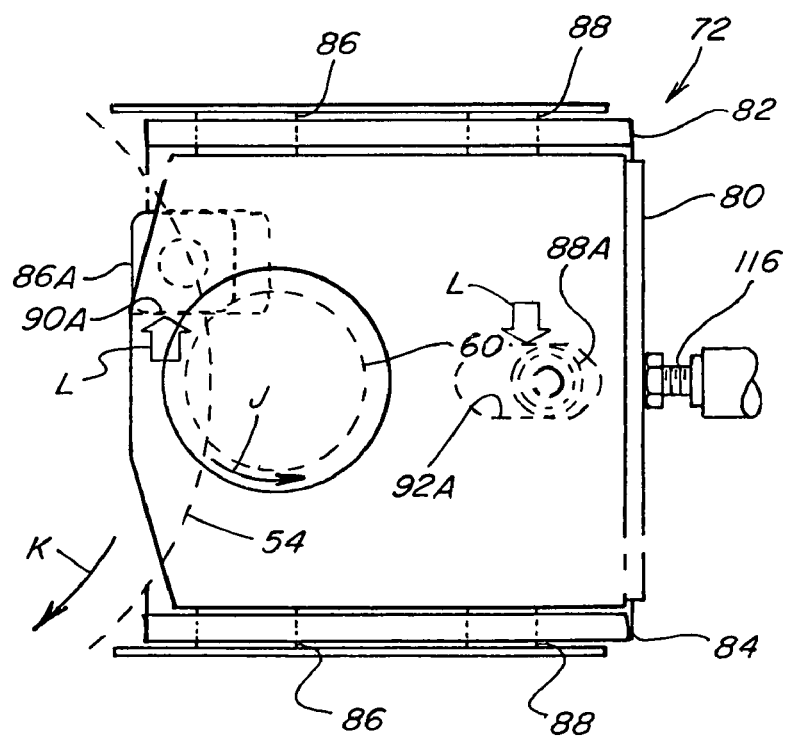
FIG. 12 is another simplified side view of the reverse drive engaging mechanism of the invention, illustrating rotation thereof for effecting reverse rotation of the reverse drive gear, and resulting force loads on aspects of support structure of the reverse drive engaging mechanism.

Referring also to FIG. 12, when slide member 80 is in its engaged position and output gear 60 is rotated while enmeshed with gear 54, as denoted by arrows J and K, and held in such engagement by piston assembly 116, for reversely rotating the feeder conveyor mechanism 14 and header drive 40 in opposition to a blockage condition (e.g., FIG. 6), high torque loads will typically be exerted against support structure 72, as generally illustrated by arrows L. More particularly, the torque will attempt to rotate or twist slide member 80 within U-shaped bracket 78, generally within the plane of the drawing of FIG. 12. Slide member 80 and U-shaped bracket 78 should be sufficiently rigid and strong to resist deformation under such loads. Additionally, it is undesirable for such loads to be exerted against guide members 86 and 88 in a manner which would damage the guide members or significantly shorten the service life thereof, or impair the ability of slide member 80 to slide relative to bracket 78. To avoid such problems, guide members 86A and 88A on bracket 78 are positioned within slots 90A and 92A of slide member 80, respectively, to receive and bear much or a substantial portion of the torque loads L, as illustrated. Guide members 86 and 88 could be sliding and/or rolling members, and are preferably constructed of a suitable smooth sliding or rolling material, such as a polymer, or a lubricant impregnated metallic material, to facilitate the sliding movement of slide member 80, and to prevent binding and seizing, and guide members 86A and 88A are suitably constructed for bearing the torque loads L exerted thereagainst by operation of power unit 56.

It should be noted that although reverse drive engaging mechanism 12 is illustrated positioned for engagement with reverse drive gear 54 disposed on shaft 48 of combine 10, the drive engaging mechanism 12 of the invention could alternatively be disposed in a variety of locations on or adjacent to a header and/or a feeder of a combine, in connection with either or both the feeder conveyor mechanism and the header drive.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A reverse drive engaging mechanism for a feeder of an agricultural combine, comprising:

a power unit including a drive motor having an output gear drivingly rotatable by the motor about an output axis therethrough;

support structure supporting the power unit and configured to be mounted proximate to a drive gear of a mechanism to be reversed, the support structure supporting the power unit such that when the support structure is mounted proximate to the drive gear the output axis will be substantially parallel to a drive axis about which the drive gear is rotatable, wherein the output and drive axes are spaced apart along a first direction, wherein the first direction is transverse to the output and drive axes, further wherein the output and drive gears are in alignment so as to engage along the first direction, and the support structure allowing the power unit to be moved substantially linearly along the first direction relative to the output and drive axes between a disengaged position wherein the output gear is disengaged from the drive gear, and an engaged position wherein the output gear is engaged with the drive gear; and an actuator controllably operable for linearly moving the power unit at least from the disengaged position to the engaged position.

2. The reverse drive engaging mechanism of claim 1, further comprising a biasing element operable for moving the power unit from the engaged position to the disengaged position.

3. The reverse drive engaging mechanism of claim 1, wherein the actuator comprises a fluid actuator.

4. The reverse drive engaging mechanism of claim 3, wherein the drive motor comprises a fluid driven motor and is connected in fluid communication with a source of pressurized fluid through the fluid actuator, such that when pressurized fluid is directed to the fluid actuator, some of the pressurized fluid will pass through the actuator so as to initially rotate the fluid driven motor for engaging the output gear with the drive gear.

5. The reverse drive engaging mechanism of claim 1, wherein the support structure includes a first structural member configured to be fixedly mounted on or in connection with a feeder, and a second structural member on which the power unit is fixedly mounted, the second structural member being supported for sliding movement relative to the first structural member in the first direction, for moving the power unit between the engaged and disengaged positions.

6. The reverse drive engaging mechanism of claim 5, wherein the first structural member is configured for supporting the second structural member in the disengaged position.

7. A reverse drive engaging mechanism comprising:

a power unit including a drive motor having an output gear drivingly rotatable by the motor about an output axis therethrough;

support structure supporting the power unit adjacent to a side of a feeder proximate to a drive gear thereof rotatable about a sidewardly extending drive axis, wherein the output axis is substantially parallel to the drive axis, wherein the output and drive axes are spaced apart along a first direction, wherein the first direction is transverse to the output and drive axes, further wherein the output and drive gears are in alignment so as to engage along the first direction, the support structure supporting the power unit for movement of the power unit substantially linearly along the first direction relative to the output axis and drive axes between a disengaged position wherein the output gear is disengaged from the drive gear, and an engaged position wherein the output gear is engaged with the drive gear; and an actuator controllably energizable for linearly moving the power unit at least from the disengaged position to the engaged position and holding the power unit in the engaged position.

8. The reverse drive engaging mechanism of claim 7, further comprising a biasing element operable for moving the power unit from the engaged position to the disengaged position when the power unit is de-energized.

9. The reverse drive engaging mechanism of claim 7, wherein the actuator comprises a piston assembly.

10. The reverse drive engaging mechanism of claim 9, wherein the drive motor comprises a fluid driven motor and is connected in fluid communication with a source of pressurized fluid through the actuator, such that when pressurized fluid is initially directed to the piston assembly, some of the pressurized fluid will be directed to the motor to initially rotate the motor for engaging the output gear with the drive gear.

11. The reverse drive engaging mechanism of claim 7, wherein the support structure includes a first structural member configured to be fixedly mounted in connection with the feeder, and a second structural member on which the power unit is fixedly mounted, the second structural member being supported for sliding movement relative to the first structural member in the first direction, for moving the power unit between the engaged and disengaged positions.

12. The reverse drive engaging mechanism of claim 11, wherein the first structural member is configured for supporting the second structural member and the power unit when in the disengaged position.

13. A feeder of an agricultural combine, comprising;
a feeder housing containing a feeder mechanism including a drive gear disposed adjacent to a side wall of the feeder housing and rotatable about a sidewardly extending drive axis therethrough in a predetermined direction for operating the feeder mechanism in a reversing direction; and a reverse drive engaging mechanism mounted adjacent to the side wall of the feeder housing, the reverse drive engaging mechanism including a power unit including a drive motor having an output gear drivingly rotatable by the motor about an output axis therethrough, wherein the output axis is substantially parallel to the drive axis, wherein the output and drive axes are spaced apart along a first direction, wherein the first direction is transverse to the output and drive axes, further wherein the output and drive pears are in alignment so as to engage along the first direction, a support structure supporting the power unit for movement linearly along the first direction relative to the output and drive axes between a disengaged position wherein the output gear is disengaged from the drive gear, and an engaged position wherein the output gear is engaged with the drive gear, and an actuator controllably energizable for linearly moving the power unit at least from the disengaged position to the engaged position and holding the power unit in the engaged position.

14. The feeder of claim 13, further comprising a biasing element operable for moving the power unit from the engaged position to the disengaged position when the power unit is de-energized.

15. The feeder of claim 13, wherein the actuator comprises a piston assembly positioned to extend therefrom for moving the power unit from the disengaged position to the engaged position and holding the power unit in the engaged position.

16. The feeder of claim 15, wherein the drive motor comprises a fluid driven motor and is connected in fluid communication with a source of pressurized fluid through the actuator, the actuator being operable such that when pressurized fluid is initially directed thereto, some of the pressurized fluid will pass therethrough so as to initially rotate the fluid driven motor for engaging the output gear with the drive gear, and such that when the power unit is moved by the piston assembly fully to the engaged position pressurized fluid will pass through the actuator to drive the motor.

17. The feeder of claim 13, wherein the support structure includes a first structural member fixedly mounted on the side wall of the feeder, and a second structural member on which the power unit is fixedly mounted, the second structural member being supported for sliding movement relative to the first structural member in the first direction, for moving the power unit between the engaged and disengaged positions.

18. The feeder of claim 17, wherein the first structural member is configured for supporting the second structural member and the power unit when in the disengaged position.

* * * * *